(12) United States Patent
He et al.

(10) Patent No.: US 8,525,947 B2
(45) Date of Patent: Sep. 3, 2013

(54) ASSEMBLY STRUCTURE FOR LIQUID CRYSTAL MODULE

(75) Inventors: Chengming He, Shenzhen (CN); Ruilian Yang, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 287 days.

(21) Appl. No.: 12/991,249

(22) PCT Filed: Sep. 30, 2010

(86) PCT No.: PCT/CN2010/077532
§ 371 (c)(1),
(2), (4) Date: Nov. 5, 2010

(87) PCT Pub. No.: WO2011/157014
PCT Pub. Date: Dec. 22, 2011

(65) Prior Publication Data
US 2012/0081631 A1 Apr. 5, 2012

(51) Int. Cl.
*G02F 1/1333* (2006.01)
(52) U.S. Cl.
USPC .......................................................... 349/58
(58) Field of Classification Search
USPC .................................................. 349/58, 158
See application file for complete search history.

(56) References Cited

U.S. PATENT DOCUMENTS

| 5,570,267 | A * | 10/1996 | Ma ............................ 361/679.21 |
| 6,512,558 | B2 * | 1/2003 | Kim ................................. 349/58 |
| 6,538,709 | B1 * | 3/2003 | Kurihara et al. ................. 349/58 |
| 2004/0046906 | A1 | 3/2004 | Lee |
| 2010/0123850 | A1 | 5/2010 | Miyashita |

FOREIGN PATENT DOCUMENTS

| CN | 1717166 A | 1/2006 |
| CN | 1828384 A | 9/2006 |
| CN | 201015018 Y | 1/2008 |
| CN | 201097033 Y | 8/2008 |
| CN | 101598860 A | 12/2009 |
| CN | 201464756 U | 5/2010 |
| JP | 2007-264202 A | 10/2007 |
| JP | 2007264202 A | 10/2007 |

* cited by examiner

*Primary Examiner* — James Dudek
(74) *Attorney, Agent, or Firm* — Ditthavong Mori & Steiner, P.C.

(57) ABSTRACT

The present invention provides an assembly structure for a liquid crystal module, which is extended to form installation margins by increasing the size of a liquid crystal panel. The installation margins are directly formed with a plurality of installation holes for connecting with a plurality of corresponding positioning holes of a backlight module by positioning elements. Thus, the liquid crystal panel and the backlight module can directly construct a liquid crystal module, without any front frame. As a result, the size of the entire liquid crystal module in relation to X, Y and Z axes can be reduced, the assembly structure for the entire liquid crystal module can be simplified, and the installation cost of the entire liquid crystal module can be saved, while the compactness and the lightweight design of a liquid crystal display can be carried out.

11 Claims, 5 Drawing Sheets

ASSEMBLY STRUCTURE FOR LIQUID CRYSTAL MODULE

FIELD OF THE INVENTION

The present invention relates to an assembly structure for a liquid crystal module, and more particularly to an assembly structure for a liquid crystal module which can omit a traditional front frame used for mounting a liquid crystal panel, so as to simplify the installation thereof.

BACKGROUND OF THE INVENTION

Nowadays, for the convenience of installation and transportation, many components are generally installed into various modules in advance during the mass production of liquid crystal displays (LCDs). For example, a backlight module is constructed by backlight sources and a diffuser plate, and then a liquid crystal module is constructed by the backlight module, a liquid crystal panel and a front frame.

Referring now to FIGS. 1 and 2, a partially exploded perspective view of a traditional liquid crystal module and a perspective view of a traditional liquid crystal panel are illustrated, respectively, wherein a liquid crystal module 10 substantially comprises a backlight module 11, a liquid crystal panel 12, a front frame 13, a plurality of first screws 14 and a plurality of second screws 15. The backlight module 11 has a housing 111, and the housing 111 is a rectangular outer housing. The housing 111 has at least one side surface formed with a plurality of first screw holes 112, while the housing 111 further has an upper surface formed with a plurality of second screw holes 113. The liquid crystal panel 12 has a driver circuit board 121 on at least one side thereof, wherein the driver circuit board 121 has a plurality of driver ICs and a plurality of openings 122 on suitable positions thereof. The front frame 13 is a rectangular outer frame, and the front frame 13 has an upper surface formed with a plurality of installation holes 131.

In installation, the liquid crystal panel 12 is firstly disposed on the backlight module 11, and the first screws 14 are used to pass through the openings 122 of the driver circuit board 121 for screw-connecting with the first screw holes 112 on the side surface of the housing 111. Then, the front frame 13 is pressed to dispose on the liquid crystal panel 12, and the second screws 15 are used to pass through the installation holes 131 on the upper surface of the front frame 13 for screw-connecting with the second screw holes 113 on the upper surface of the housing 111. Therefore, the first screws 14 and the second screws 15 can construct the backlight module 11, the liquid crystal panel 12 and the front frame 13 into one-piece liquid crystal module 10.

However, in actual installation, there are still some problems existing in the traditional liquid crystal module 10, as follows: Because the liquid crystal module 10 includes the front frame 13, the assembly structure of the entire liquid crystal module 10 can not be simplified and the installation cost of the entire liquid crystal module 10 can not be lowered. Meanwhile, because the upper surface or the side surfaces of the front frame 13 has a thickness, the installation height (i.e. the size along a Z axis) and length/width size of the entire liquid crystal module 10 (i.e. the sizes along a X and Y axes), resulting in affecting the compactness and lightweight design of the liquid crystal display.

As a result, it is necessary to provide an assembly structure design for a liquid crystal module to solve the problems existing in the traditional technology, as described above.

SUMMARY OF THE INVENTION

A primary object of the present invention is to provide an assembly structure for a liquid crystal module, which is extended to form installation margins by increasing the size of a liquid crystal panel, wherein the installation margins are directly formed with a plurality of installation holes for connecting with a plurality of corresponding positioning holes of a backlight module by positioning elements. Thus, the liquid crystal panel and the backlight module can directly construct a liquid crystal module, without any front frame. As a result, the entire liquid crystal module needs not the thickness of the traditional front frame in relation to X, Y and Z axes by omitting the front frame, so that the size of the entire liquid crystal module in relation to X, Y and Z axes can be reduced, the assembly structure for the entire liquid crystal module can be simplified, and the installation cost of the entire liquid crystal module can be saved, while the compactness and the lightweight design of a liquid crystal display can be carried out.

A secondary object of the present invention is to provide an assembly structure for a liquid crystal module, wherein the positioning elements for connecting the installation holes to the positioning holes can be made of elastic buffering material for providing a vibration absorption effect and a waterproof effect.

A third object of the present invention is to provide an assembly structure for a liquid crystal module, wherein the positioning elements for connecting the installation holes to the positioning holes can be used with washers, and the washers can be made of conductive material with a predetermined strength for providing an electrostatic grounding effect and an effect for distributing the screw-connection force of the positioning elements toward a liquid crystal panel.

To achieve the above object, the present invention provides an assembly structure for a liquid crystal module, wherein the assembly structure for the liquid crystal module comprises: a backlight module having an outer housing, wherein the outer housing has an upper surface and the upper surface is formed with a plurality of positioning holes; a liquid crystal panel having a liquid crystal display area and at least one installation margin, wherein the at least one installation margin is extended from at least one side of the liquid crystal display area and the at least one installation margin is formed with a plurality of installation holes corresponding to the positioning holes; and a plurality of positioning elements passing through the installation holes of the installation margin of the liquid crystal panel to connect the corresponding positioning holes on the outer housing of the backlight module.

Furthermore, the present invention provides another assembly structure for a liquid crystal module, wherein the assembly structure for the liquid crystal module comprises: a backlight module having a plurality of positioning holes; a liquid crystal panel having a liquid crystal display area and at least one installation margin, wherein the at least one installation margin is extended from at least one side of the liquid crystal display area and the at least one installation margin is formed with a plurality of installation holes corresponding to the positioning holes; and a plurality of positioning elements passing through the installation holes of the installation margin of the liquid crystal panel to connect the corresponding positioning holes of the backlight module.

In one embodiment of the present invention, the positioning elements are selected from screws or fasteners.

In one embodiment of the present invention, the screws are screws made of elastic buffering material.

In one embodiment of the present invention, the screws are screws made of metal, and each of the screws has an elastic buffering contact portion made of elastic buffering material for being elastically in contact with the installation margin of the liquid crystal panel.

In one embodiment of the present invention, further comprising a plurality of washers, wherein each of the washers has a through hole, and the positioning element can pass through the through hole of the washer and the installation hole of the liquid crystal panel in turn (or the installation hole of the liquid crystal panel and the through hole of the washer in turn) to connect the corresponding positioning hole of the backlight module.

In one embodiment of the present invention, the washers are washers made of conductive material.

In one embodiment of the present invention, the conductive material is metal or alloy with low hardness, plastic mixed with metal or alloy particles, or rubber mixed with metal or alloy particles.

DETAILED DESCRIPTION OF THE PREFERRED EMBODIMENTS

Figure 1:
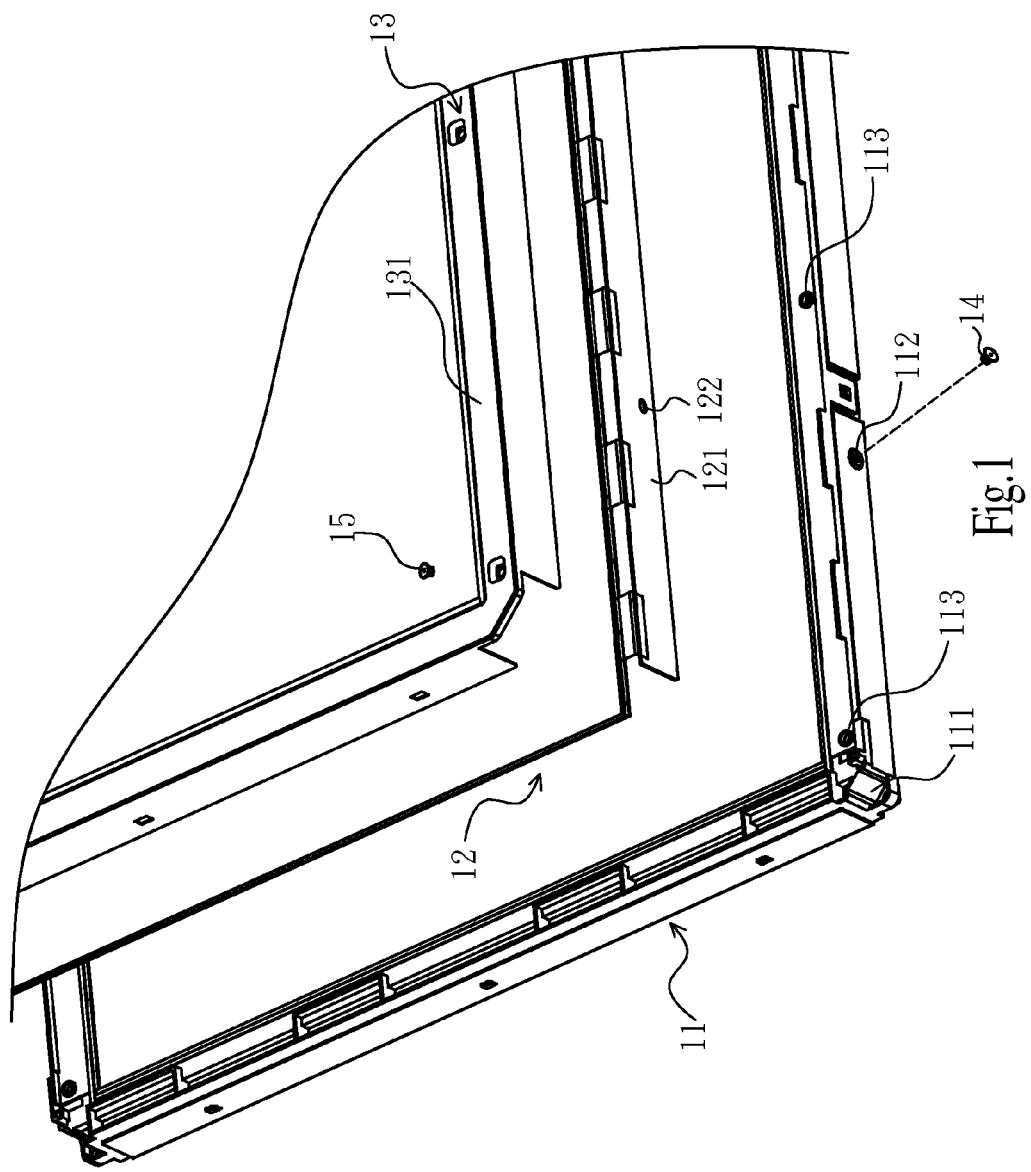
FIG. 1 is a partially exploded perspective view of a traditional liquid crystal module.
Figure 2:
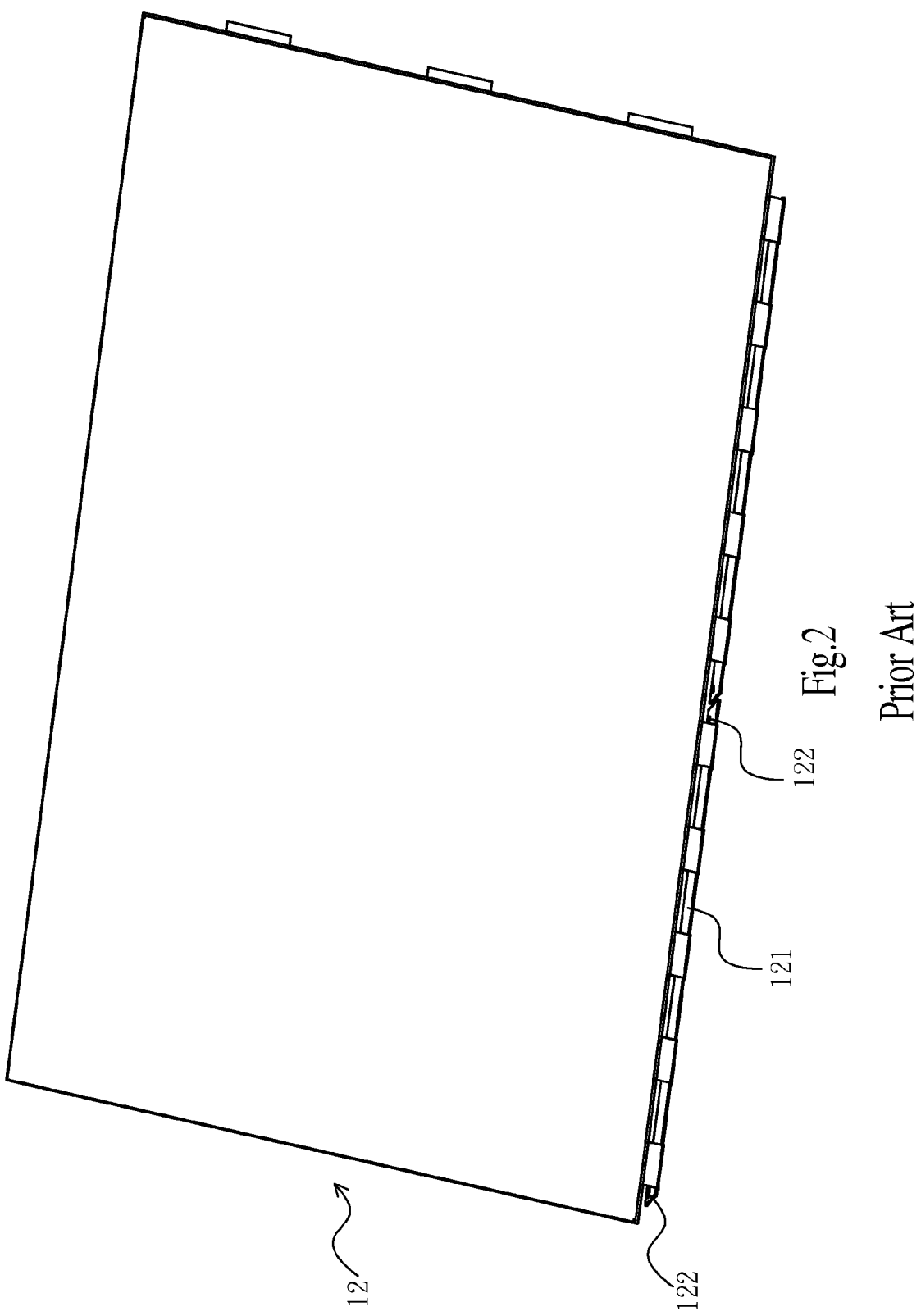
FIG. 2 is a perspective view of a traditional liquid crystal panel.
Figure 3:
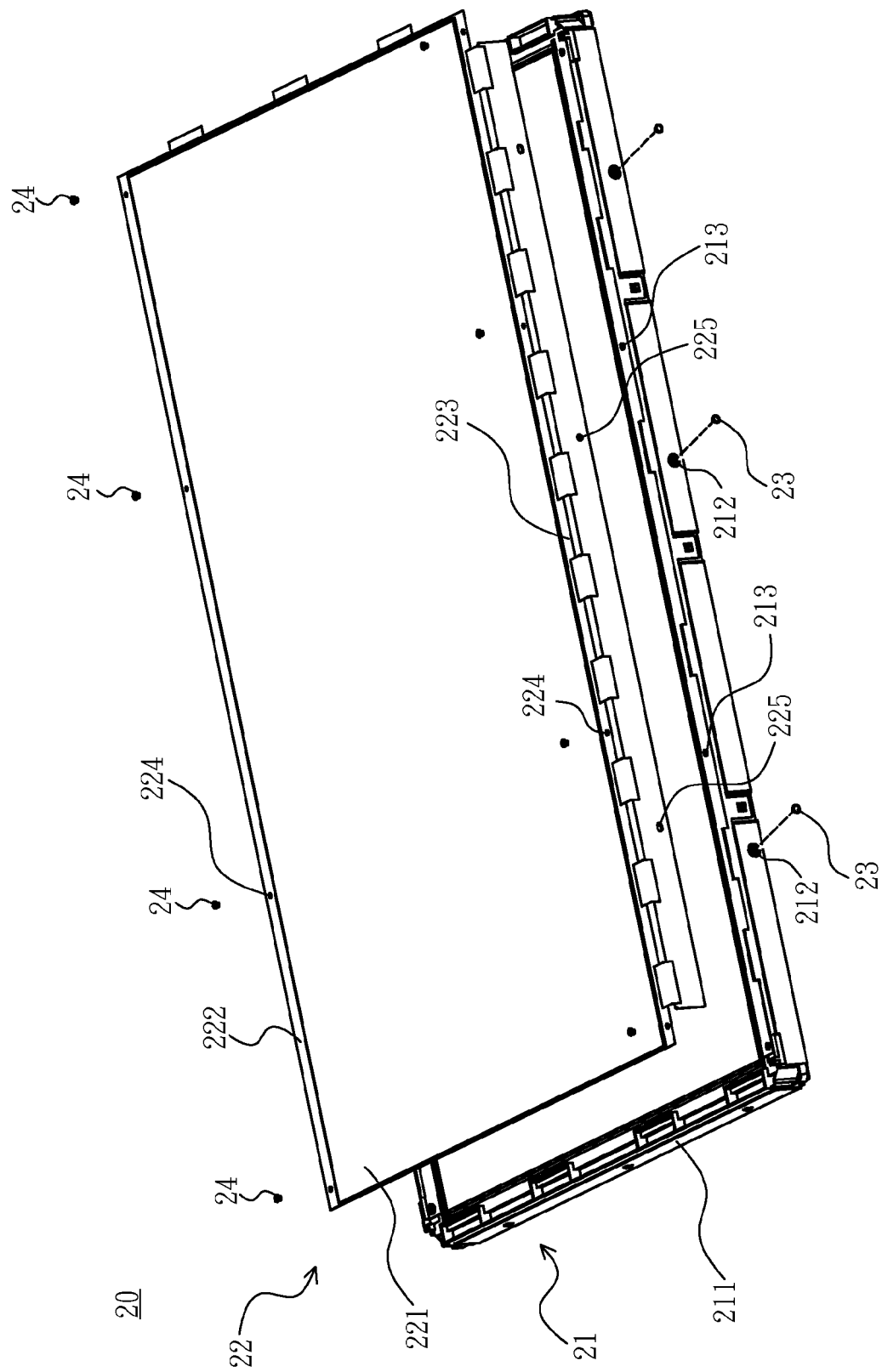
FIG. 3 is an exploded perspective view of an assembly structure for a liquid crystal module according to a first embodiment of the present invention.
Figure 4:
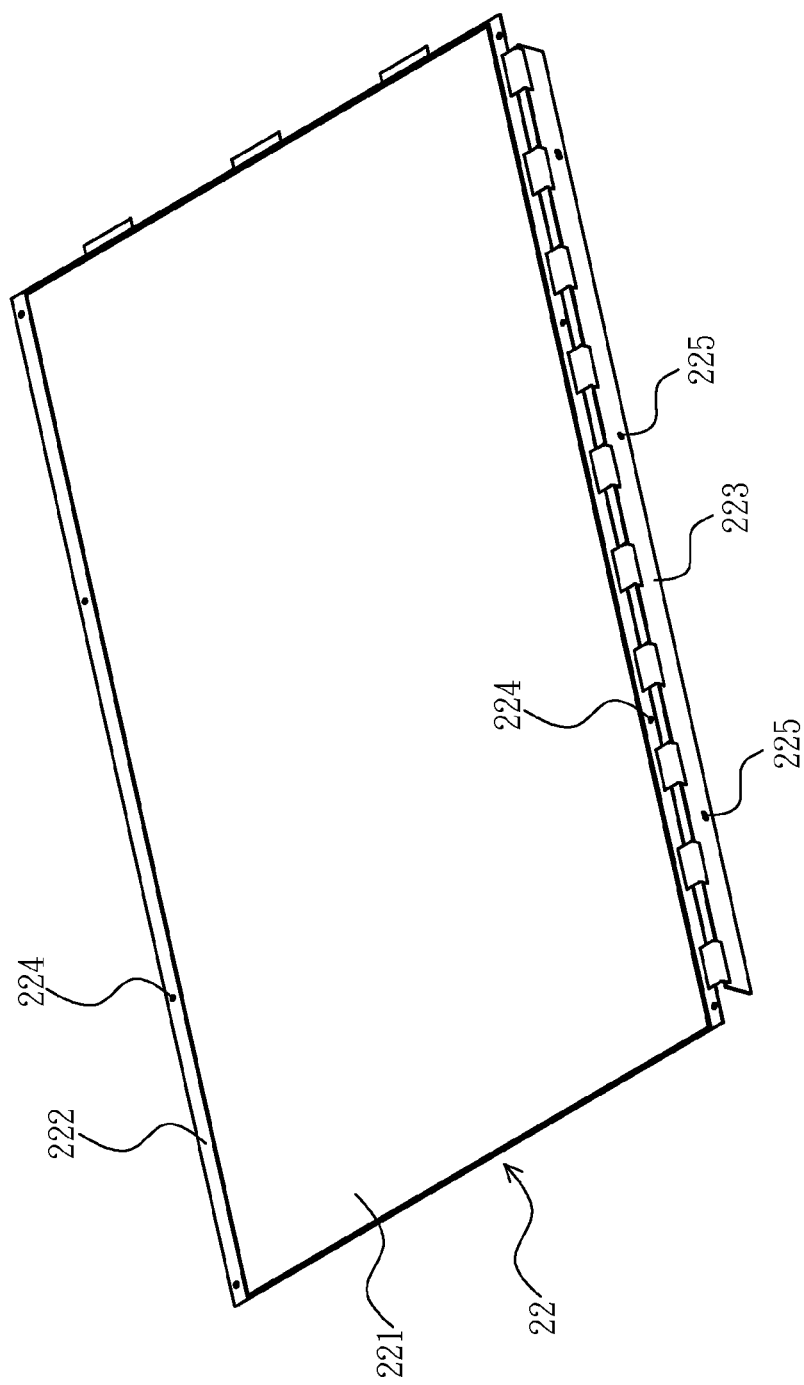
FIG. 4 is a perspective view of the liquid crystal panel according to the first embodiment of the present invention.

The structure and the technical means adopted by the present invention to achieve the above and other objects can be best understood by referring to the following detailed description of the preferred embodiments and the accompanying drawings, wherein:

Referring now to FIGS. 3 and 4, an exploded perspective view of an assembly structure for a liquid crystal module according to a first embodiment of the present invention and a perspective view of the liquid crystal panel according to the first embodiment of the present invention are illustrated, wherein an assembly structure 20 for liquid crystal module is mainly applied to the field of liquid crystal display (LCD), and the assembly structure 20 for liquid crystal module comprises a backlight module 21, a liquid crystal panel 22, a plurality of mounting elements 23 and a plurality of positioning elements 24. The present invention will describe the foregoing elements by first and second embodiments, as follows:

Referring to FIG. 3, the backlight module 21 in the first embodiment of the present invention comprises an outer housing 211, wherein the outer housing 211 is a rectangular outer housing which encloses and defines an inner space (unlabeled) for installing backlight sources and various optical sheets, such as a diffuser plate, a diffuser sheet, a prism sheet, a reflector sheet, and etc. The outer housing 211 has four side surfaces, and at least one of the side surfaces of the outer housing 211 is formed with a plurality of mounting holes 212, wherein the mounting holes 212 are preferably screw holes. Furthermore, the outer housing 211 has an upper surface, wherein at least two opposite sides of the upper surface of the outer housing 211 are formed with a plurality of positioning holes 213, and the positioning holes 213 are preferably screw holes. In the embodiment, the mounting holes 212 are formed on the side surface of at least one longer side of the outer housing 211, while the positioning holes 213 are formed on the upper surface of two opposite longer sides of the outer housing 211, but the present invention is not limited thereto. For example, the mounting holes 212 and the positioning holes 213 also can be formed on shorter sides of the outer housing 211, or simultaneously formed on the longer sides and the shorter sides at the same side or at the different sides. In addition, the outer housing 211 can be made of plastic or metal, or pre-fabricated into a body and then combined with metal plates on upper surfaces and side surfaces of the body for increasing the structural strength thereof, wherein all of the foregoing methods are possible embodiments of the present invention. In the embodiment, the positioning holes 213 are formed on the upper surface of the outer housing 211. But, in other embodiment, it should be noted that the positioning holes 213 also can be formed on other components of the backlight module 21.

Referring to FIGS. 3 and 4, the liquid crystal panel 22 in the preferred embodiment of the present invention is mainly a plate body constructed by two glass substrates, alignment films, liquid crystal and a color filter and other components (not shown), wherein the liquid crystal panel 22 comprises a liquid crystal display area 221 and at least one installation margin 222, while at least one side of the liquid crystal panel 22 is further electrically connected with a driver circuit board 223. The liquid crystal display area 221 means a zone where the liquid crystal is encapsulated between the two glass substrates, then arrangement of liquid crystal molecules can be varied according to signals of the driver circuit board 223 after finishing the following installation and thus show various colors because light of backlight sources of the backlight module 21 passes therethrough. The at least one installation margin 222 is extended from and formed on at least one side of the liquid crystal display area 221. In the embodiment, the installation margins 222 are formed on two sides of the liquid crystal display area 221, while the installation margins 222 are extended from and formed on a lower glass substrate of the two glass substrates of the liquid crystal panel 22, but the forming method thereof is not limited thereto. Besides, a plurality of suitable positions of the installation margins 222 provided with surface circuits are electrically connected to the driver circuit board 223 by a plurality of flexible circuit boards (unlabeled). Meanwhile, a plurality of suitable positions of the installation margins 222 without any surface circuits are formed with a plurality of installation holes 224, wherein the installation holes 224 are corresponding to the positioning holes 213, and the installation holes 224 are preferably through holes. In addition, a plurality of suitable positions of the driver circuit board 223 are formed with a plurality of mounting holes 225, wherein the mounting holes 225 are preferably through holes.

Figure 3A:
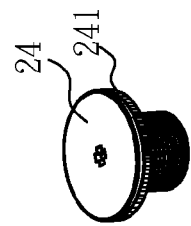
FIG. 3A is an enlarged view of another positioning element of FIG. 3 according to another embodiment of the present invention.

Referring to FIGS. 3 and 3A, the mounting elements 23 in the preferred embodiment of the present invention are preferably screws, wherein the mounting elements 23 can pass through the mounting holes 225 of the driver circuit board 223 and be screw-connected to the corresponding mounting holes 212 on the side surface of the outer housing 211 of the backlight module 21, so as to install the driver circuit board 223 onto the backlight module 21. Furthermore, the positioning elements 24 in the preferred embodiment of the present invention are preferably screws, and especially screws made of elastic buffering material, wherein the elastic buffering material can be plastic, rubber, metal or alloy with lower hardness or other material. In this way, the positioning elements 24 can be elastically in contact with the installation margins 222 of the liquid crystal panel 22. As shown in FIG. 3A, in other embodiment, the positioning elements 24 are preferably screws, and especially screws made of metal, wherein a lower edge of a nut of the screws further has an elastic buffering contact portion 241 made of elastic buffering material for being elastically in contact with the installation margin 222 of the liquid crystal panel 22. The positioning elements 24 are used to pass through the installation holes 224 on the installation margin 222 of the liquid crystal panel 22, and be screw-connected to the corresponding positioning holes 213 on the upper surface of the outer housing 211 of the backlight module 21. However, in other embodiments, the mounting elements 23 and/or the positioning elements 24 also can be selected from fasteners or other equivalent elements having mounting or positioning function, wherein the mounting holes 212 and/or the positioning holes 213 can be correspondingly selected from through holes.

Referring to FIG. 3, when the assembly structure 20 for liquid crystal module in the first embodiment of the present invention is used for installation, the backlight module 21, the liquid crystal panel 22, the mounting elements 23 and the positioning elements 24 are firstly prepared. Then, the liquid crystal panel 22 is placed on the backlight module 21, so that the installation holes 224 on the installation margins 222 can be aligned with the positioning holes 213 on the upper surface of the outer housing 211, while the mounting holes 225 of the driver circuit board 223 can be aligned with the mounting holes 212 on the side surface of the outer housing 211. After this, the mounting elements 23 are used to pass through the mounting holes 225 and be screw-connected to the corresponding mounting holes 212 on the outer housing 211, while the positioning elements 24 are used to pass through the installation holes 224 and be screw-connected to the corresponding positioning holes 213 on the outer housing 211. As a result, the mounting elements 23 and the positioning elements 24 can construct the backlight module 21 and the liquid crystal panel 22 into one piece, so as to form the assembly structure 20 for liquid crystal module.

Figure 5:
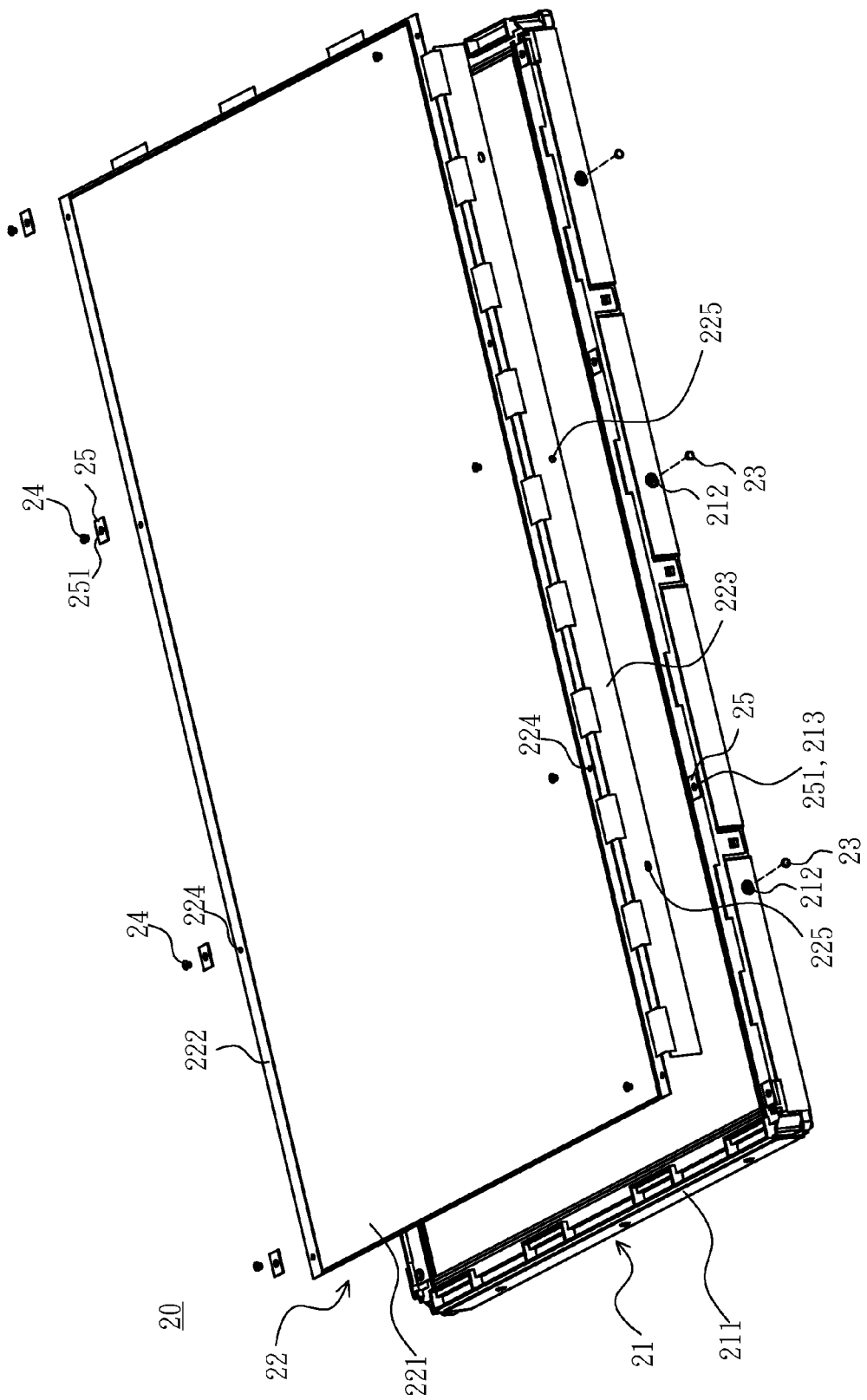
FIG. 5 is an exploded perspective view of an assembly structure for a liquid crystal module according to a second embodiment of the present invention.

Referring now to FIG. 5, an assembly structure for a liquid crystal module according to a second embodiment of the present invention is similar to the first embodiment, and substantially uses similar terms and numerals of elements, wherein the assembly structure 20 for liquid crystal module of the second embodiment similarly comprises: the backlight module 21, the liquid crystal panel 22, the mounting elements 23 and the positioning elements 24, wherein the backlight module 21 includes the outer housing 211, the outer housing 211 is formed with a plurality of mounting holes 212 on the side surface of at least one side thereof, while the outer housing 211 is formed with a plurality of positioning holes 213 on the upper surface of at least two opposite sides thereof. The liquid crystal panel 22 comprises the liquid crystal display area 221 and the at least one installation margin 222, while at least one side of the liquid crystal panel 22 is further electrically connected with a driver circuit board 223. The installation margin 222 is formed with a plurality of installation holes 224, while the driver circuit board 223 is formed with the mounting holes 225. In addition, the difference of the second embodiment of the present invention is that the assembly structure 20 for liquid crystal module of the second embodiment further comprises a plurality of washers 25, wherein each of the washers 25 has a through hole 251. The washers 25 are preferably washers made of conductive material with a predetermined strength for providing an electrostatic grounding effect and an effect for distributing the screw-connection force. The conductive material is preferably elastic buffering material, such as metal or alloy with low hardness, or plastic (or rubber) mixed with metal or alloy particles.

In installation, the washers can be sandwiched between the nuts of the positioning elements 24 and the installation margin 222 of the liquid crystal panel 22, so that the positioning elements 24 can pass through the through holes 251 of the washers 25 and the installation holes 224 of the installation margin 222 of the liquid crystal panel 22 in turn for connecting with the corresponding positioning holes 213 of the outer housing 211 of the backlight module 21. Alternatively, the washers 25 also can be sandwiched between the installation margin 222 of the liquid crystal panel 22 and the upper surface of the outer housing 211 of the backlight module 21, so that the positioning elements 24 can pass through the installation holes 224 of the installation margin 222 of the liquid crystal panel 22 and the through holes 251 of the washers 25 in turn for connecting with the corresponding positioning holes 213 of the outer housing 211 of the backlight module 21. In the present invention, the foregoing two different types of installation positions can be singly used or simultaneously used. Alternatively, because the washers 25 are preferably washers made of conductive material with a predetermined strength, so that the washers 25 can guide the static electricity on the liquid crystal panel 22 to metal plates or ground line (not shown) on the outer housing 211 of the backlight module 21 by grounding for providing an electrostatic grounding effect and an effect for distributing the screw-connection force.

As described above, in comparison with the traditional liquid crystal module which comprises the front frame and can not further simplify the assembly structure for the liquid crystal module, lower the installation cost of the liquid crystal module and reduce the size of the entire liquid crystal module in relation to X, Y and Z axes and thus cause that the compactness and the lightweight design of a liquid crystal display can not be carried out, the assembly structure 25 for liquid crystal module of the present invention as shown in FIGS. 2 to 5 is extended to form the installation margins 222 by increasing the size of the liquid crystal panel 22, wherein the installation margins 222 are directly formed with the installation holes 224 for connecting with of the corresponding positioning holes 213 of the backlight module 21 by the positioning elements 24. Thus, the liquid crystal panel 22 and the backlight module 21 can directly construct the liquid crystal module 20, without any traditional front frame. As a result, the entire liquid crystal module needs not the thickness portion of the traditional front frame in relation to X, Y and Z axes by omitting the traditional front frame, so that the reducing ratio of the thickness in relation to a height direction (i.e. Z axis) is equal to the thickness of the traditional front frame/the thickness of the entire liquid crystal module; the reducing ratio of the thickness in relation to a length direction (i.e. X axis) is equal to the thickness of two sides of the traditional front frame/the thickness of the entire liquid crystal module; and the reducing ratio of the thickness in relation to a width direction (i.e. Y axis) is equal to the thickness of two sides of the traditional front frame/the thickness of the entire liquid crystal module. As a result, the present invention is advantageous to reduce the size of the entire liquid crystal module in relation to X, Y and Z axes, simplify the assembly structure for the entire liquid crystal module, and save the installation cost of the entire liquid crystal module, while the compactness and the lightweight design of a liquid crystal display can be carried out. Furthermore, in the present invention, the positioning elements 224 for connecting the installation holes 224 to the positioning holes 213 can be made of elastic buffering material for providing a vibration absorption effect and a waterproof effect. Moreover, the positioning elements 224 also can be used with the washers 25, and the washers 25 can be made of conductive material with a predetermined strength for providing an electrostatic grounding effect and an effect for distributing the screw-connection force of the positioning elements 224 toward the liquid crystal panel 22.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. An assembly structure for a liquid crystal module, characterized in that: the assembly structure for the liquid crystal module comprises:
   a backlight module having an outer housing, wherein the outer housing has an upper surface and the upper surface is formed with a plurality of positioning holes;
   a liquid crystal panel having a liquid crystal display area and at least one installation margin, wherein the at least one installation margin is extended from at least one side of the liquid crystal display area and the at least one installation margin is formed with a plurality of installation holes corresponding to the positioning holes;
   a plurality of positioning elements passing through the installation holes of the installation margin of the liquid crystal panel to connect the corresponding positioning holes on the outer housing of the backlight module; and
   a plurality of washers, each of which has a through hole, wherein one portion of the positioning elements can pass through the through holes of the washers and the installation holes of the liquid crystal panel in turn to connect the corresponding positioning holes of the backlight module; while the other portion of the positioning elements can pass through the installation holes of the liquid crystal panel and the through holes of the washers in turn to connect the corresponding positioning holes of the backlight module; and wherein the washers are washers made of conductive material and the conductive material is metal or alloy with low hardness, plastic mixed with metal or alloy particles, or rubber mixed with metal or alloy particles.

2. An assembly structure for a liquid crystal module, characterized in that: the assembly structure for the liquid crystal module comprises:
   a backlight module having an outer housing, wherein the outer housing has an upper surface and the upper surface is formed with a plurality of positioning holes;
   a liquid crystal panel having a liquid crystal display area and at least one installation margin, wherein the at least one installation margin is formed as at least one edge of the liquid crystal panel and the at least one installation margin is formed with a plurality of installation holes corresponding to the positioning holes; and
   a plurality of positioning elements passing through the installation holes of the installation margin of the liquid crystal panel to connect the corresponding positioning holes on the outer housing of the backlight module,
   wherein the positioning elements are screws, and
   either the screws are made of an elastic buffering material, or the screws are made of metal with each of the screws having an elastic buffering contact portion made of elastic buffering material for being elastically in contact with the installation margin of the liquid crystal panel.

3. The assembly structure for a liquid crystal module according to claim 2, characterized in that: it further comprises a plurality of washers, wherein each of the washers has a through hole, and the positioning element can pass through the through hole of the washer and the installation hole of the liquid crystal panel in turn to connect the corresponding positioning hole of the backlight module.

4. The assembly structure for a liquid crystal module according to claim 2, characterized in that: it further comprises a plurality of washers, wherein each of the washers has a through hole, and the positioning element can pass through the installation hole of the liquid crystal panel and the through hole of the washer in turn to connect the corresponding positioning hole of the backlight module.

5. The assembly structure for a liquid crystal module according to claim 3, characterized in that: the washers are washers made of conductive material, and the conductive material is metal or alloy with low hardness, plastic mixed with metal or alloy particles, or rubber mixed with metal or alloy particles.

6. The assembly structure for a liquid crystal module according to claim 4, characterized in that: the washers are washers made of conductive material, and the conductive material is metal or alloy with low hardness, plastic mixed with metal or alloy particles, or rubber mixed with metal or alloy particles.

7. A assembly structure for a liquid crystal module, characterized in that: the assembly structure for the liquid crystal module comprises:
   a backlight module having a plurality of positioning holes;
   a liquid crystal panel having a liquid crystal display area and at least one installation margin, wherein the at least one installation margin is formed as at least one edge of the liquid crystal panel and the at least one installation margin is formed with a plurality of installation holes corresponding to the positioning holes; and
   a plurality of positioning elements passing through the installation holes of the installation margin of the liquid crystal panel to connect the corresponding positioning holes of the backlight module,
   wherein the positioning elements are screws, and
   either the screws are made of an elastic buffering material, or the screws are made of metal with each of the screws having an elastic buffering contact portion made of elastic buffering material for being elastically in contact with the installation margin of the liquid crystal panel.

8. The assembly structure for a liquid crystal module according to claim 7, characterized in that: it further comprises a plurality of washers, wherein each of the washers has a through hole, and the positioning element can pass through the through hole of the washer and the installation hole of the liquid crystal panel in turn to connect the corresponding positioning hole of the backlight module.

9. The assembly structure for a liquid crystal module according to claim 7, characterized in that: it further comprises a plurality of washers, wherein each of the washers has a through hole, and the positioning element can pass through the installation hole of the liquid crystal panel and the through hole of the washer in turn to connect the corresponding positioning hole of the backlight module.

10. The assembly structure for a liquid crystal module according to claim 8, characterized in that: the washers are washers made of conductive material, and the conductive material is metal or alloy with low hardness, plastic mixed with metal or alloy particles, or rubber mixed with metal or alloy particles.

11. The assembly structure for a liquid crystal module according to claim 9, characterized in that: the washers are washers made of conductive material, and the conductive material is metal or alloy with low hardness, plastic mixed with metal or alloy particles, or rubber mixed with metal or alloy particles.

\* \* \* \* \*